(12) United States Patent
Seto

(10) Patent No.: US 6,304,171 B2
(45) Date of Patent: Oct. 16, 2001

(54) EMERGENCY CALL SYSTEM WITH BATTERY SWITCHING FUNCTION

(75) Inventor: Hitoshi Seto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/758,200

(22) Filed: Jan. 12, 2001

Related U.S. Application Data

(63) Continuation of application No. PCT/JP99/02587, filed on May 18, 1999.

(51) Int. Cl.⁷ ................................................. B60R 25/10
(52) U.S. Cl. ..................... 340/426; 340/428; 340/439; 340/635; 340/636; 340/933
(58) Field of Search ................................... 340/426, 428, 340/439, 635, 636, 933

(56) References Cited

U.S. PATENT DOCUMENTS

| | | | |
|---|---|---|---|
| 5,002,840 | * 3/1991 | Klebenow et al. | 429/9 |
| 5,204,610 | * 4/1993 | Pierson et al. | 320/15 |
| 5,272,386 | * 12/1993 | Kephart | 340/328 |
| 5,549,984 | * 8/1996 | Dougherty | 340/636 |

FOREIGN PATENT DOCUMENTS 8-192723    7/1996    (JP) .

* cited by examiner

Primary Examiner—Jeffery Hofsass
Assistant Examiner—Hung Nguyen
(74) Attorney, Agent, or Firm—Sughrue, Mion, Zinn, Macpeak & Seas, PLLC

(57) ABSTRACT

In an emergency call system with the battery switching function, an auxiliary battery is arranged in a vehicle, and an arithmetic calculation control unit always monitors a battery voltage (+B) of a main battery arranged in the vehicle, an ACC voltage supplied during a driving operation of an engine and a voltage of the auxiliary battery.

4 Claims, 3 Drawing Sheets

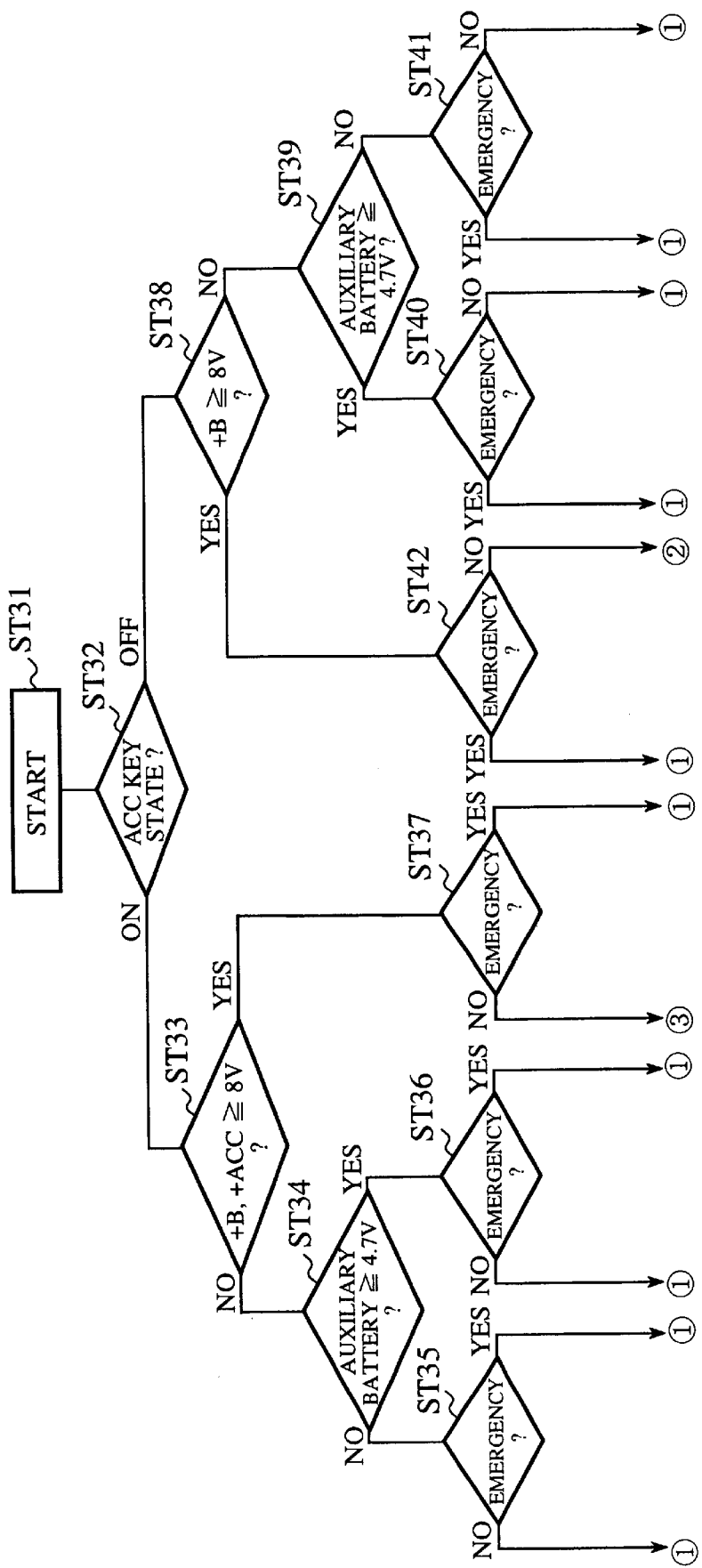

EMERGENCY CALL SYSTEM WITH BATTERY SWITCHING FUNCTION

CROSS-REFERENCE TO THE RELATED APPLICATION

This application is a continuation of International Application No. PCT/JP99/02587, whose International filing date is May 18, 1999, the disclosures of which Application are incorporated by reference herein.

BACKGROUND OF THE INVENTION

1. Field of the Invention

The present invention relates to an emergency call system with a battery switching function in which various functions such as protection of vehicle-members, prevention of the occurrence of vehicle-theft and a function for informing a legal user or a prescribed administrative agency of a present state of a vehicle when the vehicle is stolen are correctly operated in severe circumstances.

2. Description of Related Art

For example, to protect members of a vehicle when an accident of the vehicle happens, a member protecting apparatus, in which air bags are operated according to the detection of the vehicle accident, is known as a prior art. Also, to prevent the occurrence of vehicle-theft when an illegal user tries to start the operation of an engine by inserting a key into a vehicle, a vehicle-theft preventing apparatus is known as another prior art. In this vehicle-theft preventing apparatus, a password of a legal key registered in advance is compared with that of the key possessed by the illegal user. In cases where a comparison result indicates that the operation of the engine is started by using an illegal key, it is judged that the vehicle is about to be stolen. Therefore, an alarm is rang by the operation of the vehicle-theft preventing apparatus, or the operation of the engine is automatically stopped by the operation of the vehicle-theft preventing apparatus while turning a lamp on and off.

The member protecting apparatus and/or the vehicle-theft preventing apparatus are arranged in the vehicle and are operated by receiving a prescribed voltage of an electric power supplied from a battery. This battery is arranged in the vehicle to apply the prescribed voltage to the member protecting apparatus and the vehicle-theft preventing apparatus, and the apparatuses are stably operated.

However, in cases where the prescribed voltage of the battery, which is put in severe circumstances is lowered to a value lower than a pre-set voltage, there is a problem that each of the member protecting apparatus and the vehicle-theft preventing apparatus cannot be correctly operated.

Also, in cases where an electric power supply line, which is required to operate the member protecting apparatus in vehicle collision, is cut off, there is another problem that each air bag is not correctly operated.

SUMMARY OF THE INVENTION

The present invention is provided to solve the above problems, and an object of the present invention is to provide an emergency call system with a battery switching function which is always and correctly operable even though the emergency call system is put in severe circumstances.

An emergency call system with the battery switching function according to the present invention comprises an auxiliary battery; an external input interface unit for inputting a switch signal supplied from an outside to control an operation of the emergency call system; a vehicle interface unit for inputting control signals such as a vehicle speed pulse indicating a running speed of a vehicle, a signal indicating a state of an accessory switch and an air bag detecting signal through a sensor and the accessory switch arranged in the vehicle; and an arithmetic calculation control unit, which is connected with the vehicle interface unit, the auxiliary battery and the external input interface unit, for controlling operations of the vehicle interface unit, the auxiliary battery and the external input interface unit composing the emergency call system. A battery voltage supplied from a battery arranged in the vehicle, an ACC voltage generated and supplied during a driving operation of an engine and a voltage of the auxiliary battery are always monitored by the arithmetic calculation control unit. In a first case where the battery voltage and the ACC voltage are equal to or more than a prescribed value during the driving operation of the engine in case of no emergency, the arithmetic calculation control unit switches to the battery voltage and the ACC voltage to make the emergency call system be operated. In a second case where the battery voltage is equal to or more than a prescribed value during an operation stopping of the engine in case of no emergency, the arithmetic calculation control unit switches to the battery voltage to make the emergency call system be operated. In the other cases, the arithmetic calculation control unit makes the emergency call system be operated by using the auxiliary battery.

An emergency call system with the battery switching function according to the present invention further comprises a change-over switch arranged between the battery and the auxiliary battery, and the auxiliary battery is a secondary battery. In the first case where the battery voltage and the ACC voltage are equal to or more than a prescribed value during the driving operation of the engine in case of no emergency and in cases where the arithmetic calculation control unit switches to the battery voltage and the ACC voltage to make the emergency call system be operated, the arithmetic calculation control unit makes the change-over switch be set to "on" to charge the auxiliary battery with the battery voltage.

An emergency call system with the battery switching function according to the present invention further comprises a displaying unit for displaying a state of the emergency call system, and the auxiliary battery is a primary battery. In cases where a voltage of the primary battery is lowered to a value lower than a pre-set value, the arithmetic calculation control unit makes the displaying unit display a message indicating the switching of the primary battery.

An emergency call system with the battery switching function according to the present invention further comprises a GPS reception and gyro sensor unit for detecting a current position of the vehicle; and a data transmitting unit for outputting information indicating a current position of the vehicle to a help center of an outside or a portable telephone of an owner of the vehicle and inputting and outputting a control signal output from the help center or the portable telephone of the owner of the vehicle.

BRIEF DESCRIPTION OF THE DRAWINGS

FIG. 3 is an explanatory view showing an operation of the arithmetic calculation control unit.

DETAILED DESCRIPTION OF THE PREFERRED EMBODIMENTS

The invention will now be described with reference to the accompanying drawings.

EMBODIMENT 1

Figure 1:
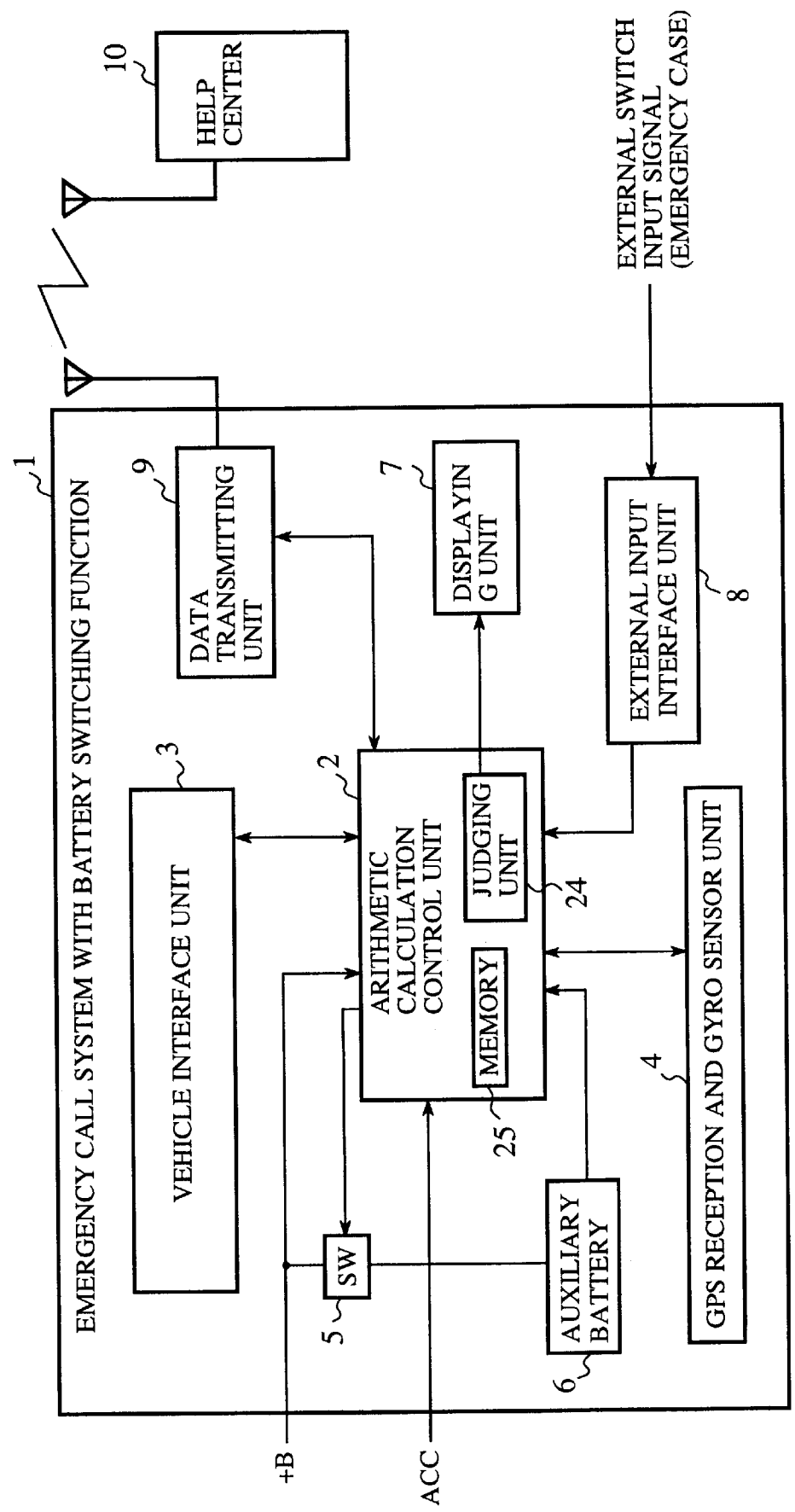
FIG. 1 is a block diagram showing an emergency call system with a battery switching function and its peripheral apparatus according to a first embodiment of the present invention.

FIG. 1 is a block diagram showing an emergency call system (EMCS) with a battery switching function and its peripheral apparatus according to a first embodiment of the present invention. In FIG. 1, 1 indicates an emergency call system with a battery switching function, and the emergency call system 1 with the battery switching function is arranged in a vehicle. 2 indicates an arithmetic calculation control unit for controlling an operation of the emergency call system 1 with the battery switching function. 3 indicates a vehicle interface unit. A voltage (+B) of a main battery (for example, an Ni—Cd battery, a lead battery or the like) arranged in the vehicle, an ACC voltage and a voltage applied from an auxiliary battery 6 are always input to and monitored in the arithmetic calculation control 2. The ACC voltage is applied from an alternating current generator (or an alternator) during the operation of an engine, and the auxiliary battery 6 is formed of a lithium battery or an Ni—Cd battery. Also, a vehicle speed pulse signal indicating a running speed of the vehicle, a signal indicating an input state of a key in an accessory switch and a control signal controlling air bags are input to the arithmetic calculation control 2 through the vehicle interface unit 3, and a prescribed processing is performed for each input signal in the arithmetic calculation control 2 to produce a plurality of control signals. The control signals are transmitted to the vehicle interface unit 3, a displaying unit 7, a data transmitting unit 9, and a change-over switch 5.

4 indicates a GPS reception and gyro sensor unit, having a global positioning system (GPS), for assuming a current position of the vehicle by using an electric wave transmitted from a gyro artificial satellite. In cases where a navigation apparatus is arranged in the vehicle, it is applicable that a GPS receiver of the navigation apparatus be used as the GPS reception and gyro sensor unit 4. 6 indicates the auxiliary battery. The selection of the change-over switch 5 operated under control of the arithmetic calculation control unit 2 is changed, and the auxiliary battery 6 is charged with the electric power of the voltage (+B) of the main battery. 7 indicates the displaying unit, which is operated under control of the arithmetic calculation control unit 2, for displaying control information such as a warning message given to the vehicle members. The displaying unit 7 is formed of a liquid crystal monitor. Also, it is applicable that a monitor of the navigation apparatus be used as the displaying unit 7. 8 indicates an external input interface unit for taking a switch input signal, which is obtained by operating an external switch in case of emergency, in the arithmetic calculation control unit 2.

When a switch input signal transmitted from the outside through the external input interface unit 8 is input to the arithmetic calculation control unit 2, the emergency call system 1 is set to a state of an emergency operation by the function of the arithmetic calculation control unit 2 of the emergency call system 1. The emergency operation performed in the emergency call system 1 is described with reference to FIG. 3.

9 indicates the data transmitting unit for transmitting a control signal (for example, a signal indicating a current position of the vehicle) produced in the arithmetic calculation control unit 2 to an help center 10 placed in the outside or a portable telephone of an owner of the vehicle, receiving another control signal from the help center 10 or the portable telephone of the owner of the vehicle and transmitting the control signal to the arithmetic calculation control unit 2. 24 indicates a judging unit. 25 indicates a memory for storing a program, which is used to control an operation of the arithmetic calculation control unit 2, and control data. The operation of the arithmetic calculation control unit 2 is described later in detail.

Figure 2:
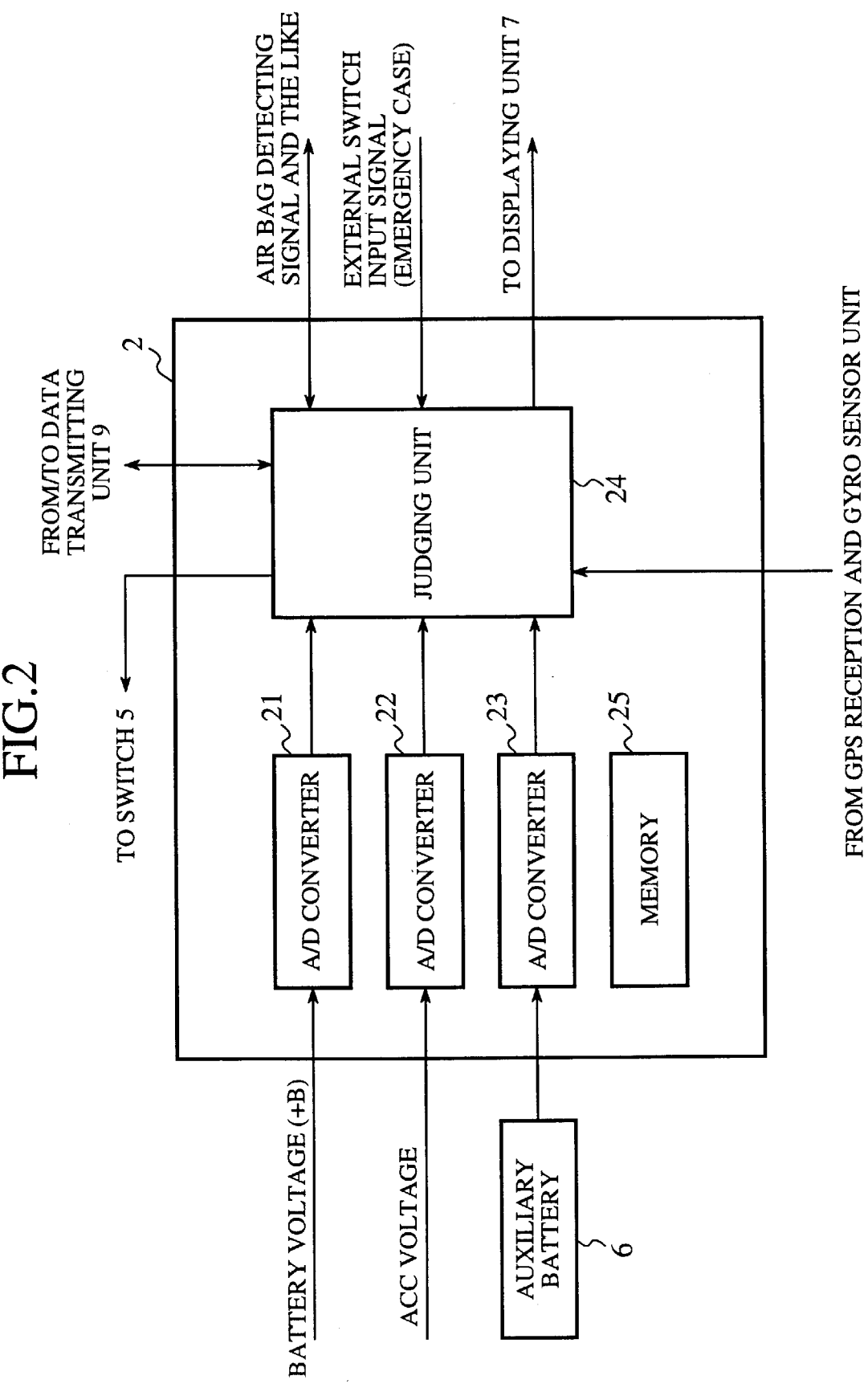
FIG. 2 is a block diagram showing the configuration of an arithmetic calculation control unit arranged in the emergency call system with the battery switching function shown in FIG. 1.

FIG. 2 is a block diagram showing the configuration of the arithmetic calculation control unit 2 arranged in the emergency call system 1 with the battery switching function shown in FIG. 1. 21 to 23 respectively indicate an A/D converter for converting one of the voltage (+B) of the main battery (hereinafter, called a battery voltage (+B)), the ACC voltage applied during the operation of the engine, which is started by inserting the key into the accessory switch, and the voltage, which is applied from the auxiliary battery 6, into a digital voltage value. 24 indicates a judging unit for producing and outputting control signals, which control operations of the switch 5, the displaying unit 7, the data transmitting unit 9 and the vehicle interface unit 3 according to digital voltage values converted in the A/D converters 21 to 23.

The emergency call system 1 with the battery switching function according to the present invention comprises the arithmetic calculation control unit 2, the vehicle interface unit 3, the GPS reception and gyro sensor unit 4, the change-over switch 5, the auxiliary battery 6, the displaying unit 7, the external input interface unit 8 and the data transmitting unit 9.

FIG. 3 is an explanatory view showing an operation of the arithmetic calculation control unit 2 arranged in the emergency call system 1 with the battery switching function shown in FIG. 1 according to the present invention. An operation of the arithmetic calculation control unit 2 described hereinafter is performed according to a program stored in the memory 25 in advance with control data.

As shown in FIG. 3, in the emergency call system 1 with the battery switching function according to the present invention, the judging unit 24 of the arithmetic calculation control unit 2 checks according to a value of a signal transmitted from the vehicle interface unit 3 whether the key is set to an on state, which is obtained by inserting the key into the accessory switch to set the engine to an operation state, or is set to an off state (step ST32).

In cases where the key inserted into the accessory switch is set to an on state, the processing proceeds to a step ST33. In the step ST33, it is checked whether or not the battery voltage (+B) and the ACC voltage (+ACC) are respectively equal to or more than 8 volts (8 V). In cases where the judgment in the judging unit 24 indicates that the battery voltage (+B) and the ACC voltage are respectively equal to or more than 8 volts (8 V), the processing proceeds to a step ST37.

In the step ST37, it is judged whether or not the vehicle is currently set to an emergency state. In cases where the vehicle is currently set to an emergency state, the auxiliary battery 6 is used as an electric power source of the emergency call system 1. In contrast, in the step ST37, in cases where the vehicle is not currently set to an emergency state, the battery voltage (+B) and the ACC voltage are used as a voltage of an electric power source of the emergency call system 1. In this case, a control signal is transmitted from the arithmetic calculation control unit 2 to the change-over switch 5, and the change-over switch 5 is set to "on" according to the control signal. Therefore, the auxiliary battery and the main battery of the voltage (+B) are connected with each other, and the auxiliary battery is charged.

Next, in the step ST33, in cases where the judgment in the judging unit 24 indicates that the battery voltage (+B) and the ACC voltage are respectively less than 8 V, the processing proceeds to a step ST34.

In the step ST34, it is judged whether or not the voltage of the auxiliary battery 6 is equal to or more than 4.7 V. In cases where the voltage of the auxiliary battery 6 is equal to or more than 4.7 V, the processing proceeds to a step ST36. In the step ST36, it is judged whether or not the vehicle is currently set to an emergency state. In cases where the vehicle is currently set to an emergency state, the auxiliary battery 6 is used as an electric power source of the emergency call system 1. In contrast, in the step ST36, in cases where the vehicle is not currently set to an emergency state, the auxiliary battery 6 is also used as an electric power source of the emergency call system 1 in the same manner as in the emergency state.

In the same manner, in the step ST34, in cases where the judgment of the judging unit 24 indicates that the voltage of the auxiliary battery 6 is less than 4.7 V, the processing proceeds to a step ST35. In the step ST35, it is judged whether or not the vehicle is currently set to an emergency state. In cases where the vehicle is currently set to an emergency state, the auxiliary battery 6 is used as an electric power source of the emergency call system 1. In contrast, in the step ST35, in cases where the vehicle is not currently set to an emergency state, the auxiliary battery 6 is also used as an electric power source of the emergency call system 1 in the same manner as in the emergency state.

Also, in cases where it is judged in the step ST32 that the key inserted into the accessory switch is set to an off state, the processing proceeds to a step ST38. In the step ST38, it is checked whether or not the battery voltage (+B) is equal to or more than 8 V. In cases where the judgment in the judging unit 24 indicates that the battery voltage (+B) is equal to or more than 8 V, the processing proceeds to a step ST42. In the step ST42, it is judged whether or not the vehicle is currently set to an emergency state. In cases where the vehicle is currently set to an emergency state, the auxiliary battery 6 is used as an electric power source of the emergency call system 1. In contrast, in the step ST42, in cases where the vehicle is not currently set to an emergency state, the battery voltage (+B) is used as a voltage of an electric power source of the emergency call system 1.

Next, in the step ST38, in cases where the judgment in the judging unit 24 indicates that the battery voltage (+B) is less than 8 V, the processing proceeds to a step ST39.

In the step ST39, it is judged whether or not the voltage of the auxiliary battery 6 is equal to or more than 4.7 V. In cases where the voltage of the auxiliary battery 6 is equal to or more than 4.7 V, the processing proceeds to a step ST40. In the step ST40, it is judged whether or not the vehicle is currently set to an emergency state. In cases where the vehicle is currently set to an emergency state, the auxiliary battery 6 is used as an electric power source of the emergency call system 1. In contrast, in the step S40, in cases where the vehicle is not currently set to an emergency state, the auxiliary battery 6 is also used as an electric power source of the emergency call system 1 in the same manner as in the emergency state.

In the same manner, in the step ST39, in cases where the judgment of the judging unit 24 indicates that the voltage of the auxiliary battery 6 is less than 4.7 V, the processing proceeds to a step ST41. In the step ST41, it is judged whether or not the vehicle is currently set to an emergency state. In cases where the vehicle is currently set to an emergency state, the auxiliary battery 6 is used as an electric power source of the emergency call system 1. In contrast, in the step ST41, in cases where the vehicle is not currently set to an emergency state, the auxiliary battery 6 is also used as an electric power source of the emergency call system 1 in the same manner as in the emergency state.

Here, in the emergency call system 1 with the battery switching function, a case where the auxiliary battery 6 functions as a secondary battery, which can be charged with the electric power of the battery voltage (+B) through the change-over switch 5, is described. However, the present invention is not limited to this case, and it is applicable that the auxiliary battery 6 be formed of a primary battery. In this case, the change-over switch 5, which is used to charge the auxiliary battery 6, is not required. Also, a voltage value of the primary battery denoting the auxiliary battery 6 is detected in the arithmetic calculation control unit 2. In cases where the voltage value of the primary battery is lowered to a value lower than a prescribed value, the arithmetic calculation control unit 2 makes the displaying unit 7 display a warning message which indicates the necessity of the battery switching and informs the user (or owner) of the primary battery switching.

Also, the arithmetic calculation control unit 2 can be, for example, formed of a microcomputer. In this case, a program used to perform the procedure shown in FIG. 3 is stored in the memory 25 in advance. Also, in this embodiment, a threshold value, which is required to correctly operate the arithmetic calculation control unit 2 of the emergency call system 1, is set to 4.7 V. However, this threshold value can be changed in dependence on a type of the microcomputer. Also, a threshold value of the battery voltage (+B) and a threshold value of the ACC voltage are respectively set to 8 V. However, these threshold values can be changed in dependence on rated values of the main battery and the alternator denoting the alternating current generator which are arranged in the vehicle. Also, these threshold values can be changed in dependence on a burden to each of the main battery and the alternator.

As is described above, the auxiliary battery 6, from which a prescribed voltage (for example, 4.7 V in the example of this embodiment) required to correctly operate the emergency call system 1 is applied to the arithmetic calculation control unit 2 even though the battery voltage (+B) is lowered, is arranged in the emergency call system 1 with the battery switching function according to the first embodiment. Also, the battery voltage (+B), the ACC voltage and the voltage of the auxiliary battery 6 are always monitored in the judging unit 24 of the arithmetic calculation control unit 2. For example, in cases where the battery voltage (+B) and the ACC voltage supplied from the generator are respectively equal to or more than 8 V during the driving operation of the engine in case of no emergency, the arithmetic calculation control unit 2 switches to the battery voltage (+B) and the ACC voltage to receive the voltages, and the arithmetic calculation control unit 2 makes the emergency call system 1 operate by supplying the battery voltage (+B) and the ACC voltage to the emergency call system 1. Also, in cases where the battery voltage (+B) is equal to or more than 8 V during the operation stopping of the engine in case of no emergency, the arithmetic calculation control unit 2 switches to the only battery voltage (+B) to receive the voltage, and the arithmetic calculation control unit 2 makes the emergency call system 1 operate by supplying the battery voltage (+B) to the emergency call system 1. Also, in the other cases, the emergency call system 1 is operated by using the voltage of the only auxiliary battery 6. Accordingly, even though the emergency call system 1 is put in severe circumstances, the emergency call system 1 is operable, and the erroneous operation of the emergency call system 1 caused by the lowering of the battery voltage (+B) can be prevented.

As is described above, the emergency call system with the battery switching function according to the present invention can be correctly operated in severe circumstances and is applicable for an emergency call system having various functions such as protection of vehicle-members, prevention of the occurrence of vehicle-theft, a function for informing a legal user or a prescribed administrative agency of a present state of a vehicle when the vehicle is stolen.

What is claimed is:

1. An emergency call system with the battery switching function, comprising:

an auxiliary battery;

an external input interface unit for inputting a switch signal supplied from an outside to control an operation of the emergency call system;

a vehicle interface unit for inputting control signals such as a vehicle speed pulse indicating a running speed of a vehicle, a signal indicating a state of an accessory switch and an air bag detecting signal through a sensor and the accessory switch arranged in the vehicle; and an arithmetic calculation control unit, which is connected with the vehicle interface unit, the auxiliary battery and the external input interface unit, for controlling operations of the vehicle interface unit, the auxiliary battery and the external input interface unit composing the emergency call system, wherein a battery voltage supplied from a battery arranged in the vehicle, an ACC voltage generated and supplied during a driving operation of an engine and a voltage of the auxiliary battery are always monitored by the arithmetic calculation control unit, the arithmetic calculation control unit switches to the battery voltage and the ACC voltage, in a first case where the battery voltage and the ACC voltage are equal to or more than a prescribed value during the driving operation of the engine in case of no emergency, to make the emergency call system be operated, the arithmetic calculation control unit switches to the battery voltage, in a second case where the battery voltage is equal to or more than a prescribed value during an operation stopping of the engine in case of no emergency, to make the emergency call system be operated, and the arithmetic calculation control unit makes the emergency call system be operated by using the auxiliary battery in the other cases.

2. An emergency call system with the battery switching function according to claim 1, further comprising:

a change-over switch arranged between the battery and the auxiliary battery, wherein the auxiliary battery is a secondary battery, the arithmetic calculation control unit makes the change-over switch be set to "on", in the first case where the battery voltage and the ACC voltage are equal to or more than a prescribed value during the driving operation of the engine in case of no emergency and in cases where the arithmetic calculation control unit switches to the battery voltage and the ACC voltage to make the emergency call system be operated, to charge the auxiliary battery with the battery voltage.

3. An emergency call system with the battery switching function according to claim 1, further comprising:

a displaying unit for displaying a state of the emergency call system, wherein the auxiliary battery is a primary battery, the arithmetic calculation control unit makes the displaying unit display a message indicating the switching of the primary battery in cases where a voltage of the primary battery is lowered to a value lower than a pre-set value.

4. An emergency call system with the battery switching function according to claim 1, further comprising:

a GPS reception and gyro sensor unit for detecting a current position of the vehicle; and a data transmitting unit for outputting information indicating a current position of the vehicle to a help center of an outside or a portable telephone of an owner of the vehicle and inputting and outputting a control signal output from the help center or the portable telephone of the owner of the vehicle.

* * * * *